Patented Oct. 27, 1942

2,300,213

UNITED STATES PATENT OFFICE 2,300,213

BORON FLUORIDE COMPLEX AS CATALYST FOR THE ESTERIFICATION OF CELLULOSE

Franklin Trimby Flaherty, Swarthmore, Pa., and Ambrose McAlevy, Wilmington, Del., assignors to E. I. du Pont de Nemours & Company, Wilmington, Del., a corporation of Delaware No Drawing. Application January 19, 1940, Serial No. 314,656

4 Claims. (Cl. 260—227)

The present invention relates to the production of esters of cellulose, for example, cellulose acetate. More particularly, it relates to the reaction of cellulose with an aliphatic acid in the presence of a boron trifluoride complex compound.

Heretofore, in the production of cellulose acetate, it has been considered necessary to esterify the cellulose by reacting the latter with acetic anhydride. In the preparation of cellulose acetate, according to the conventional, commercially practiced process, it is considered essential to use an excess of acetic anhydride over that amount theoretically necessary to react with the hydroxyl groups of the cellulose.

It has been known heretofore that cellulose esters may be prepared in an esterification mixture in which boron trifluoride is employed as a catalyst. In such previously known esterification processes, however, the boron trifluoride is used in only small, catalytically functioning quantities, for example, of the order of 2%, based on the weight of the cellulose. As a consequence, previously known processes employing a boron trifluoride catalyst necessitated the use of an excess quantity of acetic anhydride.

It has now been found that cellulose acetate, and similar organic esters of cellulose, can be very satisfactorily prepared by reacting cellulose with an esterification mixture in which the acetic anhydride is present in less amount than that theoretically necessary to react with the cellulose, or even in the absence of acetic anhydride, or other aliphatic anhydride.

It is an object of the present invention to esterify cellulose with an esterification mixture containing an aliphatic acid and less than that amount of aliphatic anhydride theoretically necessary to react with the cellulose.

It is another object of the present invention to esterify cellulose with an esterification mixture containing an aliphatic acid and less than that amount of an aliphatic anhydride theoretically necessary to react with the cellulose, but in the presence of a boron trifluoride complex compound.

Other objects of the invention will appear hereinafter.

The objects of the invention may be accomplished, in general, by reacting cellulose in the presence of at least 10% of boron trifluoride (based on the weight of the cellulose), with an esterification mixture containing an aliphatic acid and less than that amount of aliphatic anhydride theoretically necessary to react with the cellulose.

The following examples illustrate specific embodiments of the invention, it being understood that the invention is not limited to the details set forth in these examples, unless otherwise indicated, the parts given are parts by weight.

Example I 16 parts of purified cotton linters (bleached, de-waxed) were added to an acylating bath comprising 5 parts of a formic acid-boron trifluoride complex ($HCOOH.BF_3$), 50 parts of formic acid and 70 parts of benzene. This mixture was allowed to stand at room temperature for approximately two hours, after which time a good yield of cellulose formate was obtained. The product was then precipitated by the addition of water, and the precipitate was washed several times with water for the removal of boron trifluoride and formic acid. The cellulose formate, after washing, was air dried.

Example II 53 parts of acetic acid-boron trifluoride complex ($CH_3COOH.BF_3$), containing 1 mol of acetic acid per mol of boron trifluoride, was added to 110 parts of glacial acetic acid and 5 parts of cellulose. After the mixture had stood for 4 days, an excess of water was added, and the solid portion of the product was removed by filtration. This solid was washed several times with water to free it of boron trifluoride and acetic acids. Analysis of the solid product by saponification showed the presence of small amounts of cellulose acetate. The cellulose used in this example had been predigested for 4 hours in a water boron trifluoride complex ($(H_2O)_3BF_3$). If desired the esterification mixture may contain 5 parts of acetic anhydride in which case a much better yield of cellulose acetate will be obtained.

Example III 22 parts of cotton linters were added to an acylating mixture containing 57 parts of formic acid, 200 parts of benzene, 33 parts of an acetic acid-boron trifluoride complex ($CH_3COOH.BF_3$) and 186 parts of formic acid-boron trifluoride complex ($HCOOH.BF_3$). The mixture was allowed to stand at room temperature for approximately 8 hours. Substantially all of the cotton linters were converted into a product containing formylated and acetylated cellulose, the proportion of the acetylated cellulose being relatively small.

Example IV 4 parts of cellulose were dissolved, with vigorous agitation, in 15 parts of water-boron trifluoride complex [$(H_2O)_2.BF_3$] and 20 parts of formic acid. The solution required about 10 minutes. The viscous product was poured slowly into a large volume of water, which caused precipitation of a mixture of cellulose formate and regenerated cellulose. This precipitate was separated by filtration, washed with methyl formate for removal of boron trifluoride, and dried. The cellulose formate was separated from the cellulose in the precipitate by extraction with formic acid. The viscous formic acid extract of cellulose formate was evaporated on a flat surface, leaving a tough transparent film of cellulose formate, which had a molecular weight of 31,600 and which was determined to be the mono-formate of cellulose. This film had the property of gradually losing formic acid, thereby being transferred to a clear tough film of regenerated cellulose. The film also had the property of being converted into a neutral clear tough film when dipped in aqueous ammonia, and in water.

Example V

A solution of cellulose formate containing boron trifluoride was prepared in accordance with the method outlined in Example I. This solution was introduced into water or an oxygenated organic solvent bath in the form of a thin stream. A solid thread of cellulose formate was thereby obtained. The thread, upon longer contact with water or with alkali, was converted into a regenerated cellulose thread.

Example VI

A solution of cellulose formate containing boron trifluoride is prepared in accordance with the method outlined in Example IV. A flat surface was coated with the solution containing formic acid. The coating was contacted with methyl formate whereupon it was converted into a transparent tough film of cellulose formate. This film had the properties of cellulose formate film which are described in Example IV.

As above indicated in the examples, the cellulose esters may be produced by reacting cellulose in the presence of a boron trifluoride complex compound, with an esterification mixture containing an aliphatic acid, with or without an aliphatic anhydride. If an aliphatic anhydride is present in the esterification mixture, it will be present in a quantity less than that theoretically necessary to react with the hydroxyl groups of the cellulose. It is to be understood, of course, that the esterification mixture comprising the aliphatic acid may be present as a boron trifluoride complex with or without an excess of the said aliphatic acid. In the absence of an excess of the said acid, it is desired that the reaction be conducted in the presence of an inert organic liquid, such as acetone, chloroform, ethylene chloride, benzene, or the like. In any event, the formation of the cellulose ester will take place in the presence of a substantial quantity (10% or more) of a boron trifluoride complex.

The esterification mixture may contain, in addition to the aliphatic acid, a quantity of an alkyl ester of an aliphatic acid. The alkyl ester of an aliphatic acid may, or may not, be present as a boron trifluoride complex, for example a methyl formate-boron trifluoride complex, or an ethyl acetate-boron trifluoride complex. If the esterification mixture contains both an aliphatic acid and an alkyl ester of an aliphatic acid, the acid and ester may both actively react with the cellulose to cause the formation of the cellulose ester. The acyl residues of the acid and ester may be different and in this way cellulose mixed esters may be obtained in the esterification reaction.

The boron trifluoride complex present in the reaction may be a boron trifluoride complex of an aliphatic acid, a boron trifluoride complex of an alkyl ester of an aliphatic ester, or a boron trifluoride complex of water. The formation of the cellulose ester may be carried out in the presence of any one of the following compositions.

1. A boron trifluoride complex of an alkyl ester of an aliphatic acid with an aliphatic acid;
2. An alkyl ester of an aliphatic acid, a water-boron trifluoride complex, and an aliphatic acid;
3. An alkyl ester of an aliphatic acid and an aliphatic acid-boron trifluoride complex;
4. An aliphatic acid-boron trifluoride complex;
5. An aliphatic acid and a water-boron trifluoride complex;
6. An aliphatic acid with a water-boron trifluoride complex and a boron-trifluoride complex of an alkyl ester of an aliphatic acid.

The best results will be obtained by the use of the lower aliphatic acids and alkyl esters of such lower aliphatic acids; i. e., those aliphatic acids having less than 5 carbon atoms in the molecule. As examples of aliphatic acids which may be used for the formation of cellulose esters in accordance with the present invention may be mentioned the following: Formic acid, acetic acid, propionic acid, and butyric acid. As examples of alkyl esters of aliphatic acids suitable for use in accordance with the present invention may be mentioned: Methyl formate, ethyl formate, propyl formate, methyl glycollate, ethyl glycollate, propyl glycollate, methyl methoxy acetate, methyl ethoxy acetate, ethyl methoxy acetate, and the higher alkyl esters of these acetates; as well as the esters of unsubstituted acetic acid and the higher molecular weight organic acids such as propionic, butyric, isobutyric, oxalic, lactic, etc.

The above-mentioned boron trifluoride complexes of ester, acid or water may be prepared in any desired manner, for example, by the passing of gaseous boron trifluoride into the ester, acid or water.

The esterification reactions are preferably conducted at a temperature range between 0° C. and 70° C., it being usually desirable to have present an excess of the aliphatic acid or alkyl ester over and above that amount stoichiometrically required for reacting with the cellulosic material.

The ratio of boron trifluoride complex to cellulosic material treated may vary over a wide range. With highly reactive complexes, i. e., those containing less than 3 mols of acid or ester per mol of boron trifluoride, the complex may range by weight from ½ to 20 parts per part of cellulose; while if the less reactive complexes are employed, i. e., those containing more than 3 mols of acid or ester per mol of boron trifluoride, a somewhat lower range of complex to cellulose is preferably employed, say, from ¼ to 10 parts per part of cellulose treated. The weight of boron trifluoride present in the esterification mixture must in all cases exceed 10% of the weight of the cellulose.

If desired, any of the esterification reactions may be conducted in the presence of an inert organic liquid of the type above set forth. The time of esterification of the cellulose material treated will depend upon the various conditions of the reaction such as the proportion of the reactants, the temperature and the acylating strength of the complex used as the acylating agent. Aliphatic acids and alkyl esters of aliphatic acids generally form one or more complexes with boron trifluoride, for example, acetic acid and propionic acid form complex compounds containing both 1 and 2 mols of the acid per mol of the boron trifluoride. A complex containing 1 mol of acid or ester per mol of boron trifluoride is more powerful and will react with cellulose more rapidly than will a complex containing 2 mols of the acid or ester per mol of the boron trifluoride. The propionic acid-boron trifluoride complexes, as well as complexes of the weaker organic acids with boron trifluoride such, for example, as boron trifluoride complexes of butyric acid and the like do not react with the cellulose as readily as do the complexes of stronger organic acids such as those of formic and glycollic acids. Generally, the reaction may be effected in a period of 0.02 to 4 hours if the temperature is in the neighborhood of 20° to 30° C. There is evidence of esterification directly after mixing the reactants; the softening and increasing stickiness of the fibers begins instantly.

It will be appreciated that many types of organic acid esters of cellulose may be prepared in accordance with the present invention. For example, if the preparation of a cellulose acetobutyrate is desired the cellulosic material may be treated with a mixed complex comprising both acetic acid and butyric acid or their esters, or a cellulose acetate reacted with a butyric acid- or an alkyl butyrate-boron trifluoride complex. On the other hand, a cellulose butyrate partially acylated may be reacted with an acetic acid-boron trifluoride complex to form a cellulose aceto-butyrate. Subsequent to the preparation of the cellulose derivatives the boron trifluoride or boron trifluoride-organic acid, or ester, complexes may be separated from the cellulose ester and used over again for the preparation of additional quantities of a cellulose ester.

Since it is obvious that many changes and modifications can be made in the above-described details without departing from the nature and spirit of the invention, it is to be understood that the invention is not to be limited by these details except as set forth in the appended claims.

We claim:

1. The process which comprises reacting cellulose, in contact with at least 10% of a boron trifluoride complex (based on the weight of the cellulose) selected from the group consisting of complexes of boron trifluoride and an aliphatic acid, complexes of boron trifluoride and an alkyl ester of an aliphatic acid, and complexes of boron trifluoride and water, with an esterification mixture containing an aliphatic acid having less than 5 carbon atoms in the molecule and less than that amount of an aliphatic anhydride theoretically necessary to react with the hydroxyl groups of the cellulose.

2. The process which comprises reacting cellulose, in contact with at least 10% of a boron trifluoride complex (based on the weight of the cellulose) selected from the group consisting of complexes of boron trifluoride and an aliphatic acid, complexes of boron trifluoride and an alkyl ester of an aliphatic acid, and complexes of boron trifluoride and water with an esterification mixture containing formic acid.

3. The process which comprises reacting cellulose, in contact with at least 10% of a boron trifluoride complex (based on the weight of the cellulose) selected from the group consisting of complexes of boron trifluoride and an aliphatic acid, complexes of boron trifluoride and an alkyl ester of an aliphatic acid, and complexes of boron trifluoride and water with an esterification mixture containing formic acid, forming a structure from the resulting cellulose formate, and converting the cellulose formate structure to regenerated cellulose.

4. The process which comprises reacting cellulose, in contact with at least 10% of a boron trifluoride complex (based on the weight of the cellulose) selected from the group consisting of complexes of boron trifluoride and an aliphatic acid, complexes of boron trifluoride and an alkyl ester of an aliphatic acid, and complexes of boron trifluoride and water with an esterification mixture containing acetic acid and less than that amount of acetic anhydride theoretically necessary to react with the hydroxyl groups of the cellulose.

FRANKLIN TRIMBY FLAHERTY.
AMBROSE McALEVY.